Patented Feb. 17, 1948

2,436,222

UNITED STATES PATENT OFFICE 2,436,222

ADHESIVE CEMENT COMPOSITIONS

Arthur M. Neal, Wilmington, and John J. Verbanc, Tuxedo Park, Del., assignors to E. I. du Pont de Nemours & Company, Wilmington, Del., a corporation of Delaware No Drawing. Application November 23, 1943, Serial No. 511,483

4 Claims. (Cl. 260—768)

This invention relates to adhesive cements for bonding filaments, cords, fabrics and the like to vulcanized structures composed of natural rubber, synthetic rubber and the like. More particularly the invention relates to the preparation of elastomer cements adapted to bond synthetic organic fibers to rubber as in tire manufacture.

The fact that viscose rayon is not "wet" by elastomeric materials, e. g. rubber, neoprene, Buna S (butadiene-styrene interpolymer), etc., and that as a consequence, when composite articles, for example, tire carcasses, belts, etc., are made from rayon and elastomer, little adhesive strength exists between the fabric and the vulcanized elastomer, has long been recognized as a major deterrent to the use of regenerated cellulose in the manufacture of reinforced rubber articles. Many adhesive compositions have previously been proposed for developing adhesion between rayon and rubber, one of the most successful of which comprises a heat hardenable phenolic resin dispersed in rubber latex. However, this composition has several major disadvantages, the most serious of which is the fact that it must be applied as an aqueous solution, which is harmful to the rayon fabric. In addition, the coating is brittle and thus the fabric must be handled with care to prevent chipping and ultimate removal of the resin. Further the resinous composition discolors the fabric and is also extremely unstable, gelling to an unusable condition in several hours.

This invention, therefore, has as an object to provide adhesive cements which, when applied to yarns, filaments, cords, fabric and the like, will bond said materials to rubber, synthetic rubber or rubber substitutes. A further object is to provide an adhesive cement which can be employed under non-aqueous conditions. Another object is to provide an adhesive cement which will not excessively color the fabric or make it brittle. A still further object is to provide an adhesive which will bind textile fibers to elastomers both at room temperature and at elevated temperatures. These and other objects will more clearly appear hereinafter.

These objects are accomplished by our invention which, briefly stated, comprises associating an elastomeric material, e. g. rubber, a butadienestyrene copolymer, neoprene, etc., and an organic poly-isocyanate in a non-reactive volatile organic solvent to form a cement. Preferably, the elastomeric material is dissolved in a non-reactive organic solvent and the required quantity of the desired isocyanate is added to the resulting cement. It is also permissible, however, to intimately mix the elastomeric material and the desired isocyanate on a rubber mill or in a Banbury mixer or other suitable mixing equipment followed by dissolving the mix in a non-reactive organic solvent to form a cement. The cement so obtained can be applied to the fabric to be bonded in various ways. It may be applied by brushing (paint brush), spraying, dipping or with the conventional coating equipment which employs a doctor knife.

The term "elastomeric material" as used herein is intended to cover natural rubber, for example, smoked sheets, pale crepe, gutta percha, balata, and also various synthetic rubber-like materials produced from such materials as isoprene, butadiene, chloroprene, etc., alone and with other polymerizable materials. As examples of these may be cited the neoprenes, Hycar, Chemigum, GR-S, Buna S, Buna N, Perbunan, and rubber.

As examples of organic poly-isocyanates suitable for purposes of this invention the following may be named: hexamethylene diisocyanate, para-phenylene diisocyanate, 2,3-dimethyl-tetramethylene diisocyanate, decamethylene diisocyanate, para, para'-diphenylene diisocyanate, 2-chloro-trimethylene diisocyanate, 5-nitro-1,3-phenylene diisocyanate, ethylene diisocyanate, dodecamethylene diisocyanate, and meta-phenylene diisocyanate; polymethylene diisocyanates such as trimethylene diisocyanate, tetramethylene diisocyanate, pentamethylene diisocyanate, etc.; alkylene diisocyanates such as propylene-1,2-diisocyanate, butylene-1,2-diisocyanate, butylene-2,3-diisocyanate; cyclo-alkylene diisocyanates such as cyclo-hexylene-1,2-diisocyanate; aromatic diisocyanates, 1-methyl-phenylene-2,4-diisocyanate, naphthalene-1,4-diisocyanate; aliphatic aromatic diisocyanates such as xylylene diisocyanate, methylene-bis-(4-phenyl-isocyanate) and diisocyanates containing hetero atoms such as OCN—CH₂—O—CH₂NCO,

and OCH(CH₂)₃—S—(CH₂)₃NCO. In fact, any poly-isocyanate of the general formula

in which R is a divalent organic radical will function for the above said purposes of the present invention.

Certain of the organic poly-isocyanates, as for example hexamethylene diisocyanate, are liquids. These materials may be added to the elastomeric material either before or after solution of the latter in the inert solvent. In general, it is preferable to add these materials directly to the elastomer cement employing from about 0.5% to about 95% (based on the weight of the elastomer), the preferred range being from about 5% to about 25%.

As the solvent for the rubber and the cyanate compound any organic liquid or mixture thereof which is non-reactive with the cyanate compound, and which is a solvent for the elastomeric material and cyanate compound will be suitable, for example, xylene, benzene, gasoline, carbon tetrachloride, kerosene, dichloro-ethylene, chlorobenzene, etc.

The concentration of the cement may be varied from about 1% to about 50% by weight of solids, depending upon the plasticity of the elastomeric material used and the particular solvent employed. The preferred range is from about 5% to about 20%.

The adhesive cement of this invention has been found to be adaptable to most of the commonly employed fabric treating methods. The yarn, cords, or fabrics may be treated by dipping, whereby the amount deposited on the cellulose or synthetic fiber, e. g. nylon, may be regulated by means of squeeze rolls, scrapers, or other suitable devices, or by merely allowing the excess to drain off followed by solvent evaporation either spontaneously or at elevated temperatures.

We have found that the bond obtained using this type of an adhesive cement will depend among other things upon the amount deposited on the fabric to be bonded. This we have found to vary considerably depending upon the concentration of the cement and the number of treatments given the fabric. In general, in order to obtain optimum results, it has been found desirable to apply sufficient of the poly-isocyanate-rubber mixture to noticeably increase the weight of the yarn. Although the quantity of the above mentioned rubber-isocyanate material applied to the yarn will vary, depending upon the article to be manufactured and the strength of the bond desired, satisfactory results may be obtained when the increase in weight, which measures the quantity applied, is from 0.25% to 95%. In general, amounts of 5% to 20% give very satisfactory results.

The term "rubber" as used herein is intended to cover "Elastoprenes," e. g. natural rubber, gutta percha, balata, neoprene, poly-isoprene, etc., as outlined by Fisher, "Nomenclature of Synthetic Rubbers," Ind. Eng. Chem. 31, 941 (1939).

Throughout the description of this invention the term "plasticity" is employed to quantitatively describe the state of the elastomeric material being used. The numerical index in the term refers to the thickness in thousandths of an inch obtained when a pellet 2 cc. in volume is compressed isothermally at 80° C. between the platens of a press loaded with a weight of 5000 grams for a period of three minutes. The term as used is an inverse measurement of softness; i. e. 90-plasticity rubber is not as soft as 60-plasticity rubber.

The following examples further illustrate the principles of our invention and divers embodiments including the best mode contemplated for carrying out the same. Parts and percentage compositions are given by weight unless otherwise indicated.

EXAMPLE I 2.5 parts of 90-plasticity rubber and 47.5 parts of dry toluene were placed in a closed container and agitated on a shaking machine until a homogeneous cement was formed. Ten parts of hexamethylene diisocyanate was then added and the resulting solution further agitated to complete the mixing operation. The resulting cement was then ready for use.

Square woven (80 x 80) 275-denier, high tenacity regenerated cellulose fabric 3" x 5" was coated with the above mentioned cement by means of a paint brush and dried in a 70° C. oven to completely remove the solvent. When dry the fabric was weighed to determine the amount adhering (in this case 23% of the initial weight of the fabric) and placed on a 3" x 6" slab of unvulcanized rubber carcass stock calendered onto a cotton backing and vulcanized for 30 minutes at 40 pounds steam pressure (287° F.). The slabs were cooled to room temperature and died out in 1" x 6" strips. These (2 strips) were cut from the center section of the 3" x 6" slab in order to minimize the effect of overlapping of rubber and fabric. Measurement of the effective bond strength was obtained by pulling the rayon from the rubber surface at the rate of one inch/minute using a Scott tensile machine. The bond strength value of the fabric to rubber was 35 pounds/linear inch as compared with a value of 3 pounds/linear inch for a similar rayon fabric bonded to rubber without the aid of our adhesive, or an improvement of 1000% over the control.

EXAMPLE II 10 parts of 90-plasticity rubber was further plasticized by additional milling on a cold rubber mill for one hour. This rubber (which has a plasticity of approximately 60) was then added to 90 parts of dry toluene and agitated to produce a smooth uniform cement. 10 parts of hexamethylene diisocyanate was then added and the mixture further agitated to obtain good mixing. The resulting cement can be used immediately for bonding textile fibers to elastomers or can be stored at room temperature for several weeks before use without materially affecting the bonding results.

EXAMPLE III 5 parts of the following compounded rubber composition was dissolved in 95 parts of dry toluene to produce a smooth, uniform cement.

| | Parts |
|---|---|
| Rubber | 100.0 |
| Zinc oxide | 5.0 |
| Stearic acid | 1.0 |
| Sulfur | 3.0 |
| 2-mercapto-thiazoline | 1.0 |

10 parts of hexamethylene diisocyanate was added and the mixture shaken mechanically to obtain good dispersion. The resulting cement was aged for a period of 2 weeks at 25° C., and then evaluated as an adhesive in the manner described in Example I. Adhesion of rayon to rubber obtained by use of this cement was superior to the strength of the fabric.

EXAMPLE IV 2 parts of crude pale crepe rubber (approximate plasticity=300) was dissolved in 98 parts of dry toluene to produce a smooth, uniform cement having an extremely low viscosity. 4 parts of hexamethylene diisocyanate was added and the resulting cement mechanically agitated to obtain homogeneity. This cement was satisfactory for use without further treatment.

EXAMPLE V 10 parts of 20-plasticity rubber obtained by milling crude pale crepe on a cold rubber mill was dissolved in 90 parts of dry toluene. 10 parts of hexamethylene diisocyanate based on the elastomer was added at room temperature (25° C.) and the whole mixed mechanically to produce a homogeneous solution. The cement was then ready for use.

EXAMPLE VI

To 100 parts of a 10% solution of 90-plasticity pale crepe rubber in toluene was added 10 parts of hexamethylene diisocyanate. After good mechanical mixing this cement was applied to viscose rayon sailcloth in a manner outlined in Example I. Subsequent weighing of the treated fabric showed an increase in weight of 27%. Testing of the adhesive bond required a pull of 25 pounds/linear inch to remove the fabric from the vulcanized rubber or 730% increase over the untreated fabric. This same cement was allowed to age at 25° C. for a period of 4 weeks and then tested in a similar manner. Weighing of the treated fabric showed an increase in weight of 24%. A pull of 35 pounds/linear inch was required to sever the bond. This is equivalent to an increase of 1065% over the untreated fabric.

Although the examples already cited all employ hexamethylene diisocyanate as the polyfunctional agent, other polyisocyanates as hereinbefore recited may also be used. A few representative alternate compounds are disclosed in the following examples.

EXAMPLE VII 100 parts of a 10% solution of 90-plasticity rubber in toluene was well mixed by mechanical agitation with 100 parts of a 10% solution of meta-phenylene diisocyanate, also in toluene. When tested according to Example I this cement gave excellent bonds between viscose rayon and a rubber carcass stock.

EXAMPLE VIII

To a cement composed of 10 parts of 45-plasticity rubber and 90 parts of dry toluene was added 10 parts of para,para'-diphenylene diisocyanate. The resulting solution was mechanically agitated to obtain good mixing. This cement was also found to give excellent adhesive bonds between viscose rayon and rubber carcass stock.

EXAMPLE IX 20 parts of 75-plasticity rubber was thoroughly mixed at 25° C. with 180 parts of dry benzene. 20 parts of methylene-bis-(4-phenyl-isocyanate) was added and the whole agitated mechanically to obtain good mixing. The cement gave excellent adhesions between viscose rayon and rubber carcass stock. Greater improvement in bond strength, however, was noted after aging the cement for three weeks at 25° C.

EXAMPLE X 5 parts of balata rubber were dissolved in 95 parts of dry toluene to produce a smooth, uniform cement. To this cement was added 5 parts of hexamethylene diisocyanate and the resulting solution shaken to obtain good mixing. The resulting cement can be used immediately for bonding textile fibers to elastomers or can be stored at 25° C. for a period of several weeks.

EXAMPLE XI 10 parts of 45-plasticity rubber was dissolved in 90 parts of an organic solvent to produce a smooth uniform cement. 10 parts of hexamethylene diisocyanate was added with agitation at 25° C. After agitating, the cement was evaluated as a bonding agent for adhering rayon to rubber carcass stock as outlined in Example I. The following table shows the various types of solvents employed and the effectiveness of the resulting cements.

TABLE

Bonding "Cordura" rayon to a rubber carcass stock

| Exp. No. | Solvent Employed | Deposition of Cement (per cent Weight of Fabric) | Pounds Pull per Linear Inch at 25° C. | |
|---|---|---|---|---|
| | | | (1) | (2) |
| 1 | Toluene | 20.0 | 34.0 | 37.0 |
| 2 | Benzene | 20.0 | 30.0 | 32.0 |
| 3 | 65-Octane Gasoline | 20.0 | 35.0 | 35.0 |
| 4 | #73-Solvesso³ | 20.0 | 35.0 | 40.0 |
| 5 | Carbon tetrachloride | 20.0 | 33.0 | 35.0 |
| 6 | 1,2,4-Trichlorobenzene | 20.0 | 28.0 | 30.0 |
| 7 | Trichloroethylene | 20.0 | 30.0 | 33.0 |

(1) and (2) are check determinations.
³ Aromatic hydrocarbons of petroleum origin.

EXAMPLE XII

Vulcanized rubber prepared by heating 100 parts of rubber and 10 parts of sulfur for 120 minutes at 60 pounds steam pressure (307° F.) was shredded on a rubber mill and extracted with acetone in a Soxhlet extractor to remove unreacted sulfur.

The resulting product was peptized and made into a cement by heating in a mixture of toluene and piperidine. The resulting peptized rubber was precipitated by addition of denatured ethyl alcohol (Formula 2B) and the rubbery mass well washed with 2B-alcohol to remove all possible traces of piperidine. The rubbery mass was then air dried and finally dissolved in toluene to produce a 10% cement.

To 100 parts of this cement was added 10 parts of hexamethylene diisocyanate. The resulting solution was mixed mechanically to produce a uniform cement. This material showed good bonding properties when tested according to the procedure outlined in Example I.

The so-called synthetic rubbers may also be used in the practice of our invention. The following examples describe the use of various types of neoprene synthetic rubber in place of natural rubber in conjunction with polyfunctional isocyanates.

EXAMPLE XIII 60 parts of neoprene, prepared according to the method described in U. S. P. 2,264,173, Example 25, was placed on a small rubber mill and broken down to form a smooth sheet. 0.25 part of diethyl ammonium diethyl dithiocarbamate was added and the resulting mixture milled for an additional thirty minutes. The resulting softened neoprene was dissolved in 240 parts of benzene to produce a smooth 20% cement. 30 parts of hexamethylene diisocyanate was added with mechanical stirring. The cement was used immediately for bonding textile fibers to rubber. Aging of the cement for several days at 25° C. did not decrease the efficiency of this adhesive.

EXAMPLE XIV 10 parts of neoprene, prepared according to the method described in U. S. P. 2,264,173, Example 25, was plasticized by milling on a cold (15°–20° C.) rubber mill for a period of twenty minutes. The resulting softened mass was dissolved in 90 parts of dry toluene. 10 parts of hexamethylene diisocyanate was added to the smooth cement. After mixing mechanically to obtain a homogeneous solution the material was evaluated according to Example I. Excellent results were obtained in bonding textile fibers to a typical neoprene carcass stock.

EXAMPLE XV 50 parts of neoprene obtained by interpolymerizing a mixture of chloroprene and acrylonitrile was placed in a churn along with 950 parts of dry xylene. The mixture thus formed was agitated for 24 hours at 25° C. during which time the neoprene dissolved forming a smooth uniform cement. 5 parts of hexamethylene diisocyanate was added and the agitation continued to obtain a uniform solution. This cement was evaluated immediately and found to give excellent adhesion between cellulosic fibers and neoprene synthetic rubber.

EXAMPLE XVI 100 parts of neoprene obtained by interpolymerizing a mixture of chloroprene and acrylonitrile was placed in a churn along with 900 parts of dry xylene and agitated until a smooth cement was obtained. 16.6 parts of methylene-bis-(4-phenyl-isocyanate) was added and the agitation continued for a short period of time in order to obtain good mixing. The cement so obtained had a Stormer viscosity of 11.6 seconds at 25° C. This cement was successfully employed in bonding viscose rayon to rubber, Buna S (butadiene-styrene interpolymer) or neoprene.

EXAMPLE XVII 50 parts of a low molecular weight chloroprene polymer (molecular weight approximately 900) was added to a churn along with 200 parts of dry xylene and mechanically agitated at 25° C. to form a smooth cement. 10 parts of methylene-bis-(4-phenyl-isocyanate) was added and the mixture further agitated to obtain good mixing. The resulting cement gave excellent results in bonding viscose rayon to carcass stock made of neoprene obtained by the method of U. S. P. 2,264,173, Example 25.

EXAMPLE XVIII 50 parts of neoprene obtained by interpolymerizing a mixture of chloroprene and isoprene was placed on a rubber mill and broken down for a period of 15 minutes. The resulting masticated elastomer was dissolved in 950 parts of xylene forming a smooth cement. 5 parts of hexamethylene diisocyanate was added at 25° C. with agitation. This cement was evaluated according to Example I and gave excellent adhesive bonds between viscose rayon and neoprene.

Other synthetic elastomers have been found suitable for use in manufacturing our adhesive cements. The following examples are typical.

EXAMPLE XIX 50 parts of an elastomer prepared from butadiene (70 parts) and dimethyl-vinylethynyl-carbinol (30 parts) was masticated by milling for 10–20 minutes on a rubber mill. The resulting plasticized elastomer was dissolved in 450 parts of dry benzene to form a uniform cement. 50 parts of hexamethylene diisocyanate was added and the mixture agitated to obtain good mixing. This cement was evaluated immediately and gave excellent adhesions between viscose rayon and a typical rubber carcass stock.

EXAMPLE XX 20 parts of neoprene and 20 parts of a copolymerization product prepared from 75 parts butadiene and 25 parts styrene were milled together on a rubber mill for a period of 30 minutes. During this milling period the mixture became plastic and tacky. The resulting masticated polymer mixture was placed in 180 parts of dry benzene in a closed container and the contents agitated to produce a smooth cement having a Stormer viscosity of 25 seconds at 30° C. 20 parts of hexamethylene diisocyanate was added and the cement agitated to obtain good mixing. The resulting cement was tested immediately and showed good bonding power in adhering cotton to a vulcanizable rubber carcass stock.

EXAMPLE XXI 100 parts of a copolymerization product of 75 parts butadiene and 25 parts styrene was milled on a cold rubber mill for a period of 2 hours. The resulting plasticized polymer was dissolved in 900 parts of 65-octane gasoline, forming a smooth low viscosity cement. 25 parts of methylene-bis-(4-phenyl-isocyanate) was added and the resulting mixture agitated mechanically to obtain a uniform cement. The resulting adhesive combination was tested as a bonding agent for adhering viscose rayon to a vulcanized rubber carcass stock. Good bonds were obtained.

The term "neoprene" is a generic term for synthetic rubber-like material made by polymerizing 2-chlorobutadiene-1,3 in the presence or absence of modifiers and other polymerizable substances.

In direct contrast to previously known adhesives, the present invention increases the durability to flexing and bending of a pad consisting of plies of fabric treated with the cements of this invention to which a skim coat of compounded rubber stock has been applied and the resulting pad vulcanized. For example, where such a pad prepared from untreated regenerated cellulose fabric may be flexed 2,250 times and a similar one prepared from untreated cotton may be flexed 27,000 times before separation of the plies takes place, a similar pad prepared from regenerated cellulose fabric treated in accordance with the cements outlined above may be flexed about 150,000 times before separation of the plies takes place.

Moreover, if square woven viscose rayon sailcloth, treated with an elastomer cement described above is placed upon a compounded rubber stock such as is customarily used in the manufacture of tires, and the whole vulcanized, the treated rayon is found to be strongly bonded to the rubber. If the treated rayon fabric is subjected to a standard pull-off test at an elevated temperature, for example, 212° F., to measure the bond between the fabric and rubber at this temperature, the bond is found to be at least equal to and often better than the bond of cotton to rubber at this temperature, a fact which is of the utmost importance in the construction of tires, fan belts and similar articles, which develop a high temperature under normal conditions of usage. Many of the previously known adhesives fail to provide a satisfactory bond at temperatures in this range.

In addition to the foregoing advantages, the treatment of regenerated cellulose cord or fabric with the cements of this invention does not excessively discolor, stiffen or harden the cord or fabric. The cords or fabrics treated with these cements are relatively non-tacky and exhibit no peeling or cracking as is often the case with adhesives known to the art at the present time. The use of our cements, contrary to the processes of the prior art, is carried out in the absence of water. Water is known to be deleterious to regenerated cellulose cord and fabric, since it causes a pronounced swelling and weakening of this material. This adhesive also possesses several additional advantages. These are (1) ease of application, (2) simplicity of equipment, making unnecessary any pronounced changes in the equipment in current commercial processes for the treatment of fabrics or individual cords, and (3) the cheapness and availability of these raw materials.

These adhesive cements have also been found useful in bonding various types of materials other than textile fibers to vulcanized elastomeric materials. For example, wood, leather and various metals such as iron, steel, brass, etc., have all been bonded to rubber carcass stock by means of the adhesives of this invention.

This application is a continuation-in-part of our U. S. patent application Serial No. 436,536, filed March 27, 1942, now Patent 2,415,839.

Since it is obvious that various changes and modifications may be made in the above description without departing from the nature and spirit thereof, this invention is not restricted thereto except as set forth in the appended claims.

We claim:

1. An adhesive cement composition comprising an elastoprene, an organic diisocyanate and a non-reactive volatile organic solvent.

2. An adhesive cement composition comprising rubber, an organic diisocyanate, and a non-reactive, volatile organic solvent.

3. An adhesive cement composition comprising a non-reactive volatile organic solvent and from about 1% to about 50% by weight of solids comprising essentially an elastoprene and from about 0.5% to about 95% by weight, based on the weight of the elastoprene, of an organic diisocyanate.

4. An adhesive cement composition comprising a non-reactive volatile organic solvent and from about 5% to about 20% by weight of solids comprising essentially rubber and from about 5% to about 25% by weight, based on the weight of rubber, of an organic diisocyanate.

ARTHUR M. NEAL.
JOHN J. VERBANC.

REFERENCES CITED

The following references are of record in the file of this patent:

UNITED STATES PATENTS

| Number | Name | Date |
|---|---|---|
| 2,277,083 | Dorough | Mar. 24, 1942 |
| 2,313,945 | Kellog et al. | Mar. 16, 1943 |
| 2,356,005 | Roguemore | Aug. 15, 1944 |